US009481837B2

(12) United States Patent
Velazquez-Vargas et al.

(10) Patent No.: US 9,481,837 B2
(45) Date of Patent: Nov. 1, 2016

(54) CHEMICAL LOOPING PROCESSES FOR PARTIAL OXIDATION OF CARBONACEOUS FUELS

(71) Applicant: Babcock & Wilcox Power Generation Group, Inc., Barberton, OH (US)

(72) Inventors: Luis G Velazquez-Vargas, Copley, OH (US); Thomas J Flynn, North Canton, OH (US); Bartev B Sakadjian, Canton, OH (US); Douglas J DeVault, Rootstown, OH (US); David L Kraft, Massillon, OH (US)

(73) Assignee: The Babcock & Wilcox Company, Baberton, OH (US)

( * ) Notice: Subject to any disclaimer, the term of this patent is extended or adjusted under 35 U.S.C. 154(b) by 0 days.

(21) Appl. No.: 13/835,676

(22) Filed: Mar. 15, 2013

(65) Prior Publication Data

US 2014/0275297 A1  Sep. 18, 2014

(51) Int. Cl.
*C10J 3/72* (2006.01)
*C10K 3/04* (2006.01)
*C10G 2/00* (2006.01)
(Continued)

(52) U.S. Cl.
CPC .. *C10J 3/72* (2013.01); *C10G 2/30* (2013.01); *C10G 2/32* (2013.01); *C10J 3/12* (2013.01); *C10J 3/725* (2013.01); *C10K 3/04* (2013.01); *C01B 3/12* (2013.01); *C10J 2300/093* (2013.01);
(Continued)

(58) Field of Classification Search
CPC ............ C01B 3/12; C10G 2/30; C10G 2/32; C10J 2300/093; C10J 2300/1618; C10J 3/06; C10J 3/26; C10J 3/72; C10J 3/725; C10K 3/04; Y02E 60/36

USPC ............. 252/372, 373; 423/418.2; 518/702; 60/772
See application file for complete search history.

(56) References Cited

U.S. PATENT DOCUMENTS 1,746,464 A   2/1930  Fischer
2,602,809 A   7/1952  Dickinson
(Continued)

FOREIGN PATENT DOCUMENTS

WO   2009124019 A2   10/2009
WO   2009136909 A1   11/2009
(Continued)

OTHER PUBLICATIONS

Andrus, Herbert E. et al, Alstom Hybrid Combustion-Gasification Chemical Looping Coal Power Technology Development, Phase III-Final Report, Sep. 30, 2008, pp. 1-14; 23, Report # PPL-08-CT-25, DOE Contract DE-FC26-03NT41866.
(Continued)

*Primary Examiner* — Jafar Parsa
*Assistant Examiner* — Amy C Bonaparte
(74) *Attorney, Agent, or Firm* — Eric Marich; Christopher L. Smith

(57) ABSTRACT

Processes, systems and equipment can be used to convert carbonaceous fuel to an output gas stream that includes CO as a primary C-containing product. In some embodiments, the processes and systems also can produce $H_2$ in a separate reaction, with the $H_2$ advantageously being capable of being combined with the CO from a partial oxidation process to provide syngas which, in turn, can be used to produce fuels and chemicals. The processes and systems can be tuned so as to not produce significant amounts of $CO_2$ and do not require an air separation unit.

21 Claims, 8 Drawing Sheets

(51) Int. Cl.
C10J 3/12 (2006.01)
C01B 3/12 (2006.01)

(52) U.S. Cl.
CPC . C10J 2300/1618 (2013.01); C10J 2300/1807 (2013.01); Y02E 60/36 (2013.01)

(56) References Cited

U.S. PATENT DOCUMENTS

| | | | |
|---|---|---|---|
| 3,442,619 A | | 5/1969 | Huebler et al. |
| 4,272,399 A | * | 6/1981 | Davis et al. .................. 252/373 |
| 4,323,446 A | * | 4/1982 | Chervenak et al. .......... 208/410 |
| 5,447,024 A | | 9/1995 | Ishida et al. |
| 5,827,496 A | | 10/1998 | Lyon |
| 6,007,699 A | | 12/1999 | Cole |
| 6,532,905 B2 | | 3/2003 | Belin et al. |
| 6,667,022 B2 | | 12/2003 | Cole |
| 6,669,917 B2 | | 12/2003 | Lyon |
| 7,767,191 B2 | | 8/2010 | Thomas et al. |
| 7,837,975 B2 | | 11/2010 | Iyer et al. |
| 2009/0000194 A1 | | 1/2009 | Fan et al. |
| 2009/0018222 A1 | * | 1/2009 | Klepper et al. ............... 518/704 |
| 2009/0263316 A1 | | 10/2009 | Iyer et al. |
| 2010/0193370 A1 | * | 8/2010 | Olah et al. .................... 205/450 |
| 2010/0283009 A1 | | 11/2010 | Nickels et al. |
| 2011/0046421 A1 | * | 2/2011 | Daniel et al. .................. 568/885 |
| 2011/0094226 A1 | * | 4/2011 | McHugh et al. ............... 60/645 |
| 2011/0200520 A1 | | 8/2011 | Ramkumar et al. |
| 2011/0286902 A1 | | 11/2011 | Fan et al. |
| 2012/0171588 A1 | | 7/2012 | Fan et al. |
| 2014/0034134 A1 | | 2/2014 | Fan et al. |

FOREIGN PATENT DOCUMENTS

| | | |
|---|---|---|
| WO | 2010099555 A1 | 9/2010 |
| WO | 2012064712 A1 | 5/2012 |
| WO | 2014124011 A1 | 8/2014 |
| WO | 2014159956 A1 | 10/2014 |
| WO | 2015103591 A1 | 7/2015 |

OTHER PUBLICATIONS

Cao, Yan et al., Investigation of Chemical Looping Combustion by Solid Fuels. 1. Process Analysis, Energy & Fuels 2006, pp. 1836-1844, published on Web Jul. 11, 2006, Institute for Combustion Science and Environmental Technology, Western Kentucky University.

De Diego, Luis F. et al., Synthesis gas generation by chemical-looping reforming using a Ni-based oxygen carrier, Energy Procedia 1 (2009), pp. 3-10, Department of Energy and Environment, Instituto de Carboquimica, Zaragoza, Spain, available online at www.sciencedirect.com.

Fan, L.S. et al., Chemical Looping Systems for Fossil Energy Conversions, 2010, pp. 241-250; 328-338, John Wiley & Sons, New Jersey.

Hildebrandt, Diane et al., Producing Transportation Fuels with Less Work, Science, Mar. 27, 2009, pp. 1680-1681, vol. 323, available at www.sciencemag.org.

Li, Fanxing et al., Coal Direct Chemical Looping (CDCL) Process for Hydrogen and Power Generation, Jun. 20, 2009, pp. 1-10, Department of Chemical and Biomolecular Engineering, The Ohio State University, Columbus, Ohio, available at http://www.netl.doe.gov/technologies/coalpower/ewr/co2/pubs/5289%20Ohio%20State%20chemical%20looping%20paper%20Clearwater%20jun09.pdf.

Mattisson, Tobias et al., Applications of chemical-looping combustion with capture of CO2, Second Nordic Minisymposium on Carbon Dioxide Capture and Storage, Göteborg, Oct. 26, 2001, pp. 46-51, Department of Energy Conversion, Chalmers University of Technology, S-412 96 Goteborg, Sweden, available at http://www.entek.chalmers.se/anly/symp/symp2001.html.

Mattisson, Tobias et al., Possibility of using iron oxide as an oxygen carrier for combustion of methane with removal of CO2—Application of chemical-looping combusion, Fifth International Conference on Greenhouse Gas Control Technologies, Aug. 13-16, 2000, pp. 205-210, Cairns, Australia, available at www.entek.chalmers.se/~anly/co2/ghgt5.pdf.

Mattisson, Tobias et al., Reactivity of Some Metal Oxides Supported on Alumina with Alternating Methane and Oxygen—Application for Chemical-Looping Combustion, Energy & Fuels 2003, pp. 643-651, published on Web May 2, 2003.

Mattisson, Tobias et al., The use of iron oxide as an oxygen carrier in chemical looping combustion of methane with inherent separation of CO2, Fuel 80, 2001, pp. 1953-1962.

Moghtaderi, Behad, Review of the Recent Chemical Looping Process Developments for Novel Energy and Fuel Applications, Energy & Fuels, Published Oct. 12, 2011, pp. 15-40, ACS Publications.

Ortiz, Maria et al., Hydrogen production by auto-thermal chemical-looping reforming in a pressurized fluidized bed reactor using Ni-based oxygen carriers, International Journal of Hydrogen Energy 35 (2010), available online Nov. 17, 2009, pp. 151-160, Department of Energy and Environment, Instituto de Carboquimica, Zaragoza, Spain, available online at www.sciencedirect.com.

Rizeq, George et al., Fuel-Flexible Gasification-Combustion Technology for Production of H2 and Sequestration-Ready CO2, Oct. 2003, pp. 1-44, DOE Award No. DE-FC-00FT40974, GE Global Research.

Ryden, Magnus et al., Using steam reforming to produce hydrogen with carbon dioxide capture by chemical-looping combustion, International Journal of Hydrogen Energy 31 (2006), available online Jan. 26, 2006, pp. 1271-1283, Dept of Energy and Environment, Chalmers University of Technology, Gothenburg, Sweden, available online at www.sciencedirect.com.

Tomlinson, Glen et al., Chemical-Looping Process in a Coal-to-Liquids Configuration, Independent Assessment of the Potential of Chemical-Looping in the Context of a Fischer-Tropsch Plant, Dec. 2007, pp. 1-15, Interagency Agreement: DE-AI26-04NT422291 Contract: NBCH-C-2-0039, Order D0200390051.

New Zealand First Examination Report, dated Mar. 21, 2014, IP No. 622376.

Extended European Search Report, dated Jul. 1, 2014, Application No./Patent No. 14159916.7-1361.

Puneet Gupta et al., Syngas Redox (SGR) Process to Produce Hydrogen from Coal Derived Syngas, Energy & Fuels 2007, Journal, Aug. 21, 2007, 2900-2908, vol. 21, No. 5, American Chemical Society, Published on Web.

Written Opinion of the International Search Authority, dated May 14, 2015, for International Application No. PCT/US2015/010280 for WO 2015103591 A1.

European Patent Office (EPO) Office Action dated Mar. 3, 2016, Communication pursuant to Article 94(3) EPC.

* cited by examiner

CHEMICAL LOOPING PROCESSES FOR PARTIAL OXIDATION OF CARBONACEOUS FUELS

BACKGROUND INFORMATION

Chemical looping processes are designed to transfer energy stored in carbonaceous fuels to metal oxide particles, which then release that energy in a separate reaction. Interest in chemical looping combustion processes for power generation has grown over the past few decades because the resulting carbon dioxide ($CO_2$) can be sequestered without a need for an air separation unit (ASU).

Chemical looping processes employing a wide variety of system designs and flow regimes, e.g., moving bed, fluidized bed, and bubbling bed, have been designed to convert methane ($CH_4$) to $CO_2$.

A moving packed bed reactor in which a solid fuel such as coal is introduced at a midpoint of the moving packed bed reactor to set up a countercurrent flow pattern (upwardly flowing gas, downwardly flowing particles), which permits essentially complete conversion of the carbonaceous fuel into readily sequestered $CO_2$ and water ($H_2O$), is described in U.S. Pat. No. 7,767,191 and U.S. Pat. Publ. No. 2009/0000194. A metal oxide such as iron (III) oxide ($Fe_2O_3$) oxidizes coal, a reaction that reduces the metal oxide to a lower oxidation state (e.g., FeO) or even free metal (Fe). Reduced iron-containing particles are oxidized in a separate reactor (employing a packed or fluidized bed reactor), which fully regenerates the original metal oxide and produces significant amounts of heat that can be used to produce steam for power.

Researchers at Western Kentucky University have developed a chemical looping process that employs a combination of moving bed and bubbling fluidized bed (BFB) to fully oxidize a solid fuel like coal.

Chemical looping gasification methods are designed to produce hydrogen gas ($H_2$) in addition to $CO_2$. For example, researchers at the Instituto de Carboquímica have described a gasification process in which nickel oxide particles in a fluidized bed are employed to convert $CH_4$ and $H_2O$ to syngas, a mixture of $H_2$ and carbon monoxide (CO), as a primary product. The fuel stream includes $H_2O$ because production of $H_2$ is the targeted output product of the equipment and process.

A chemical looping process that can convert a carbonaceous fuel, particularly a solid such as coal, to a gaseous output where $CO_2$ is not the primary C-containing product and does not require the inclusion of an ASU remains of significant commercial interest.

SUMMARY

The processes, systems and equipment described herein can be used to convert carbonaceous fuels to CO as a primary C-containing product of the fuel conversion process. Advantageously, an ASU need not be included in the processes, systems and equipment.

In some embodiments, the processes and systems can produce $H_2$ in a separate step or reaction, and that $H_2$ can be combined with CO from the fuel conversion process to provide syngas which, in turn, can be used to produce organic fluids (e.g., fuels and chemicals) using techniques such as a Fischer-Tropsch (F-T) process.

The processes and systems can be tuned so as to avoid producing significant amounts of $CO_2$ and, at least in some embodiments, can employ $CO_2$ to facilitate production of CO in the fuel conversion step.

In one aspect is provided a chemical looping process in which partial oxidation of a carbonaceous fuel yields CO as a primary conversion product. This conversion can be performed in the presence of metal oxide particles which, in turn, can be returned to the fuel conversion vessel after being regenerated (oxidized) in another vessel. The conversion preferably occurs while the carbonaceous fuel and the metal oxide particles move in the same direction, i.e., a co-current flow pattern.

Heat produced by the highly exothermic regeneration step can be transferred to the vessel where the endothermic fuel conversion step is performed. Such heat transfer can occur through any one or more of particle movement, appropriate placement (i.e., proximity) of reaction vessels, and circulating heat transfer fluids.

The regeneration portion of the foregoing process also can be adapted to generate $H_2$. In this scenario, the two predominant products of the overall chemical looping process are the primary components of syngas, which permits the process to be adapted to and integrated with a variety of other synthetic and/or power generation processes.

The chemical looping partial oxidation systems and processes described herein generate predominant reaction products that themselves are useful in other processes. These differences and the resulting advantages are more fully described and easily understood by reference to the brief description of previously available chemical looping combustion and gasification systems and the detailed description of the inventive systems and processes set forth in the Figures of illustrative embodiments and the text that describes them.

These and other non-limiting aspects of the disclosure are more particularly described below.

Unless the surrounding text explicitly indicates a contrary intention, any value given herein in the form of a percentage in connection with a gaseous stream, input or product is a volume percentage (v/v), while all other values given in the form of percentages are weight percentages (w/w). Also, the "~" symbol when used in connection with a number has the meaning dictated by the surrounding context and includes the number itself as well as at least the degree of error commonly associated with measurements of the particular quantity in question.

The relevant portion(s) of any specifically referenced patent and/or published patent application is/are incorporated herein by reference.

DETAILED DESCRIPTION

Figure 1:
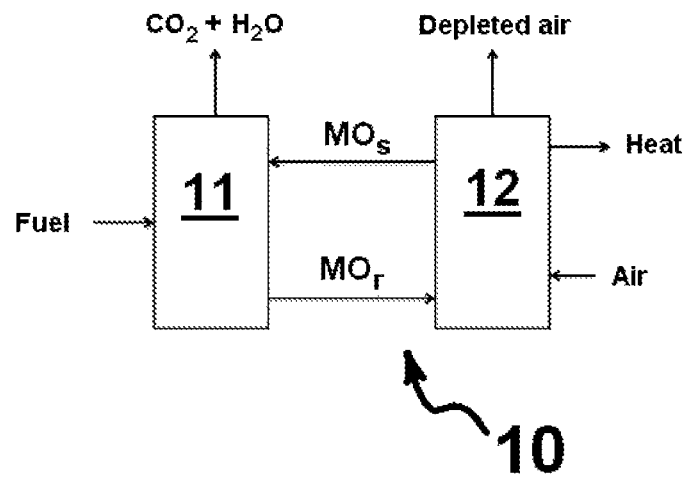
FIG. 1 is a schematic representation of a chemical looping combustion system of the prior art.

A more complete understanding of the processes and apparatuses disclosed herein can be obtained by reference to the accompanying drawings, which schematically represent the existing art and/or the present development and, therefore, are not intended to indicate relative size and dimensions of the assemblies or components thereof. In those drawings and the description below, like numeric designations refer to components of like function. Specific terms are used in that description for the sake of clarity, but these terms are intended to refer only to the particular structure of the embodiments selected for illustration in the drawings, and are not intended to define or limit the scope of the disclosure.

FIG. 1 schematically depicts a prior art chemical looping combustion system. Unlike a direct combustion system in which the oxygen necessary for combustion is provided in the form of gaseous $O_2$ (neat or as a component of air), chemical looping combustion system 10 employs metal oxide particulates in fuel conversion reactor 11 to deliver oxygen atoms to the carbonaceous fuel, which can be represented by the formula $C_xH_yX_z$ where x is a positive integer, y≤2x+2, z is zero or a positive number, and X represents one or more optional elements other than C and H (e.g., O, S, Hg, etc.). The fuel can be, or can include, a solid, liquid or gas, non-limiting examples of which include coal, crude oil or a refined product thereof, oil-rich solids such as shale or oil sands, biomass, hydrocarbon-rich gases (e.g., natural gas), CO, pet-coke, waste gases from fuel cells, and the like. Solid or liquid fuels optionally can be gasified prior to being oxidized by the metal oxide-delivered oxygen. (The entry point of fuel into fuel conversion reactor 11 in FIG. 1 and the Figures that follow is not intended to be limited to the position shown. The schematics merely are intended to show inputs and outputs, not necessarily positional relationships unless the accompanying text indicates otherwise.)

Fuel conversion reactor 11 can be any of a variety of designs, non-limiting examples of which include moving or fixed bed reactors, one or more fluidized bed reactors, rotary kiln, and the like, all constructed from materials that can withstand operational temperatures of from ~1000° to ~1500° C., and preferably designed and constructed so as to minimize heat loss, for example, by being refractory lined. Fuel conversion reactor 11 typically operates at a temperature of from ~600° to ~1200° C. and a pressure of from ~0.1 to ~20 MPa. Residence times in fuel conversion reactor 11 vary widely, for example, from ~0.1 to ~20 hours, commonly from ~0.2 to ~10 hours, and typically from ~0.3 to ~5 hours.

Moving bed reactors typically employ densely packed solid metal oxide particles moving downwardly while fuel and product gases move upwardly, i.e., a countercurrent contacting pattern. The aforedescribed U.S. Pat. No. 7,767, 191 and U.S. Pat. Publ. No. 2009/0000194 modify this flow pattern by introducing metal oxide particles near the top of fuel conversion reactor 11 while introducing a solid fuel, such as pulverized coal, somewhat downstream therefrom. (Here, and throughout the remainder of this document, the terms "downstream" and "upstream" refer to spatial relationships based on the overall movement of metal oxide particles, not necessarily on relative positions or heights.) The fuel quickly de-volatilizes and forms char, which then reacts with the downwardly flowing metal oxide particles, a reaction that can be enhanced by introducing a small amount of $H_2$ near the bottom of the moving bed to form $H_2O$ which can react with, and thereby gasify, char. (Introducing near the bottom of the moving bed a small amount of $CO_2$ can further enhance char gasification via a reverse Boudouard reaction.) The availability of large amounts of fully oxidized metal oxide particles permits full or nearly full conversion of hydrocarbons to $CO_2$ and $H_2O$. Gases produced by the carbonaceous fuel flow in a direction generally opposite that of the metal oxide particles.

Hot, fully oxidized metal oxide ($MO_s$, where s represents a high oxidation state for M) particles are reduced when they react with (combust) the fuel to produce common combustion products, primarily $CO_2$ and $H_2O$. Cooler, reduced metal oxide ($MO_r$, where r represents a lower oxidation state for M, i.e., r<s) particles are conveyed to particle regeneration unit 12 where they are re-oxidized. While air is shown as the oxidant in FIG. 1 and the other Figures, any gas that contains significant amounts of $O_2$ (e.g., at least ~1% by volume, commonly at least ~5% by volume, and typically at least ~10% by volume) can be used. Staging introduction of air into particle regeneration unit 12 can assist in controlling liberated heat, which can assist in maintaining the particle temperature in a range that preserves reactivity and mechanical integrity.

Oxidation of the reduced metal oxide particles is highly exothermic, with particle regeneration unit 12 typically operating at a temperature of from ~1000° to ~1500° C. and a pressure of from ~0.1 to ~20 MPa. $MO_r$ particles enter particle regeneration unit 12 up to several hundred degrees Celsius cooler than the temperature at which the $MO_s$ particles entered fuel conversion reactor 11. Although not shown in FIG. 1, heat produced by the highly exothermic oxidation process occurring in particle regeneration unit 12 can be used for steam generation.

Particle regeneration unit 12 can take the form of a lift vessel, with $MO_r$ particles entering near the bottom and air entering near the bottom and/or part way up the sides. Particle regenerator unit 12 can be refractory-lined or can have a membrane wall construction, with the latter affording an opportunity for additional steam generation.

In system 10 and the other systems described below, the metal oxide particles can be transported throughout the system via pneumatic conveyors, belt conveyors, bucket elevators, screw conveyors, moving beds, fluidized bed reactors, and the like.

In certain embodiments, regenerated $MO_s$ particles are not degraded and maintain nearly all of their functionality/activity throughout numerous cycles.

The aforementioned U.S. Pat. No. 7,767,191 claims to achieve higher energy conversion efficiency by containing the metal oxide in a porous composite, a modification that increases the surface area for redox reactions to occur and enhances the ability of the particles to survive numerous processing cycles. The porous composite can be in the form of pellets, a mesoporous matrix with pore sizes of from ~2 to ~25 nm, or particles having an average diameter of from ~0.05 to ~50 mm. The ceramic material of the composite can be an oxide of Al, Ti, Zr, Y, Si, La, Ba, or Sr or a carbide of Si, Ti or Fe; the metal of the metal oxide is a transition metal such as Fe, Cu, Ni, Sn, Co, V, Ru, Zn, Mn, or Mo; and an optional promoter or catalyst can be Fe, Cu, Li, Na, K, Rb, Cs, Be, Mg, Sr, Ba, B, P, Ni, Sn, Co, V, Zn, Ga, Rh, Mo, Pt, Pd, Ag, Ru, Cr, Mn, or Ca or an oxide or sulfide thereof. Non-limiting examples of potentially useful composites include $Fe_2O_3$ supported on $TiO_2$, on a mixture of $TiO_2$ and $Al_2O_3$, or on Y-stabilized Zr.

The overall reaction that occurs in chemical looping combustion system 10 is similar to that involved in a more standard direct combustion process, i.e., a hydrocarbon and $O_2$ are converted to $CO_2$ and $H_2O$. Nevertheless, unlike $CO_2$ produced by a direct combustion process, the $CO_2$ produced in fuel conversion reactor 11 is concentrated (at least ~90% purity) and, accordingly, far easier to sequester. Pressurizing fuel conversion reactor 11 can facilitate the process of sequestering the $CO_2$ product.

Figure 2:
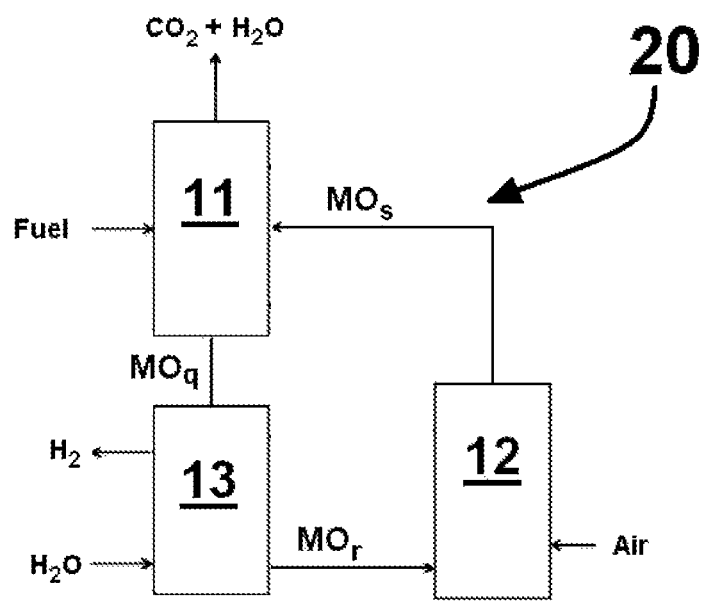
FIG. 2 is a schematic representation of a chemical looping combustion system of the prior art which employs a multi-step process to re-oxidize reduced metal oxide particles.

FIG. 2 schematically depicts a second prior art chemical looping combustion system. In addition to the components employed in combustion system 10 of FIG. 1, chemical looping combustion system 20 interposes $H_2$ generation unit 13 between fuel conversion reactor 11 and particle regeneration unit 12. Thus, chemical looping combustion system 20 can produce $H_2$ in addition to the primary products ($CO_2$ and $H_2O$) resulting from chemical looping combustion system 10 from FIG. 1.

Generation unit 13 typically is operated at a temperature of from ~400° to ~1200° C. and a pressure of from ~0.1 to ~15 MPa.

In the system and process depicted in FIG. 2, particulate $MO_s$ (where s again represents a high oxidation state for M) is reduced to $MO_q$ (where q is a low oxidation state for M) when it oxidizes the fuel to produce $CO_2$ and $H_2O$. The reduced $MO_q$ particles are partially oxidized to the $MO_r$ state (where r represents an oxidation state for M that is lower than s but higher than q, i.e., q<r<s) in $H_2$ generation unit 13 during the reduction of $H_2O$ to $H_2$ before being conveyed to particle regeneration unit 12 where they are fully oxidized to the s oxidation state.

Figure 12A:
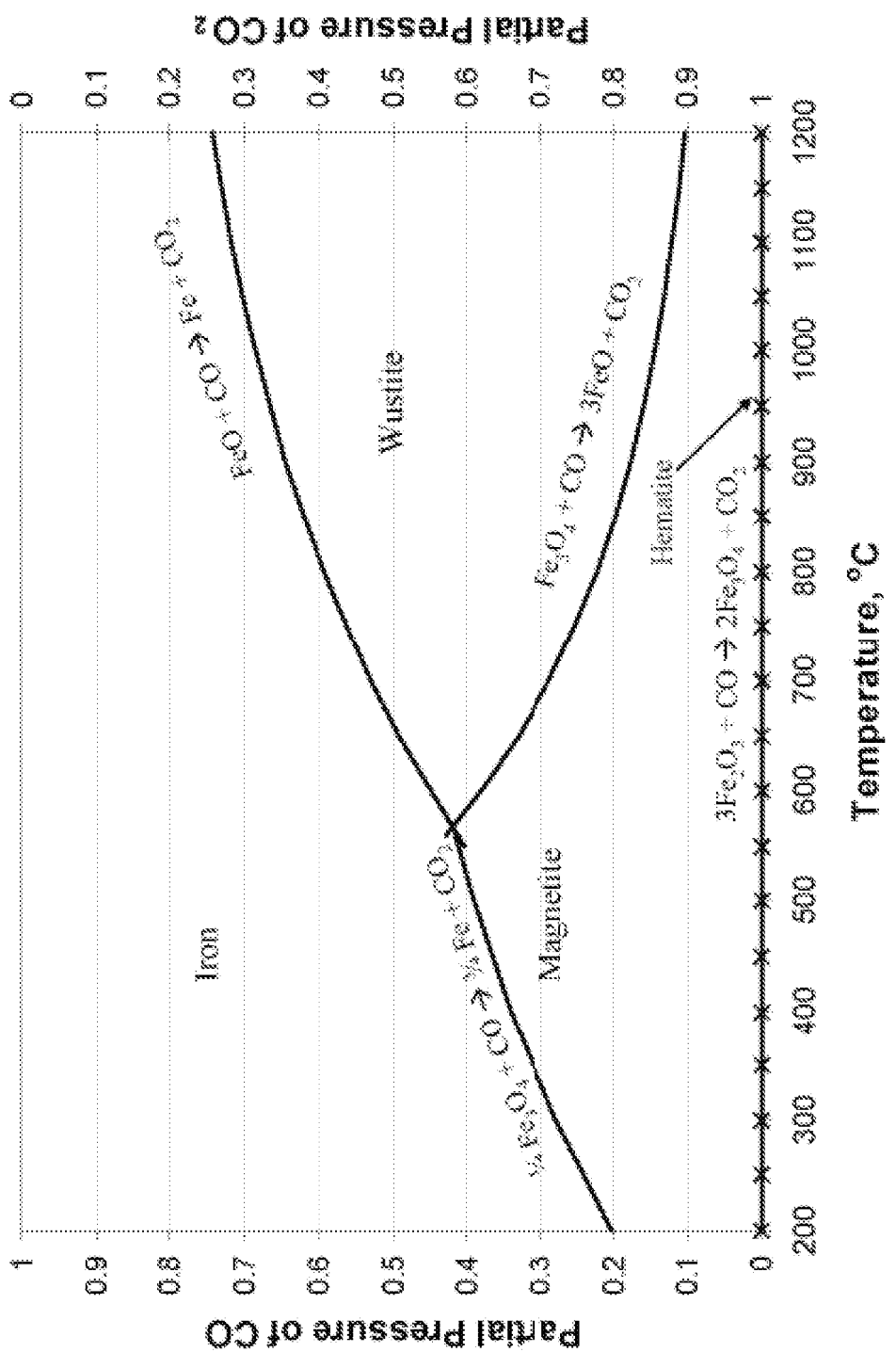
FIG. 12a is a plot of $CO/CO_2$ partial pressure equilibrium curves in the presence of iron in its various oxidation states.
Figure 12B:
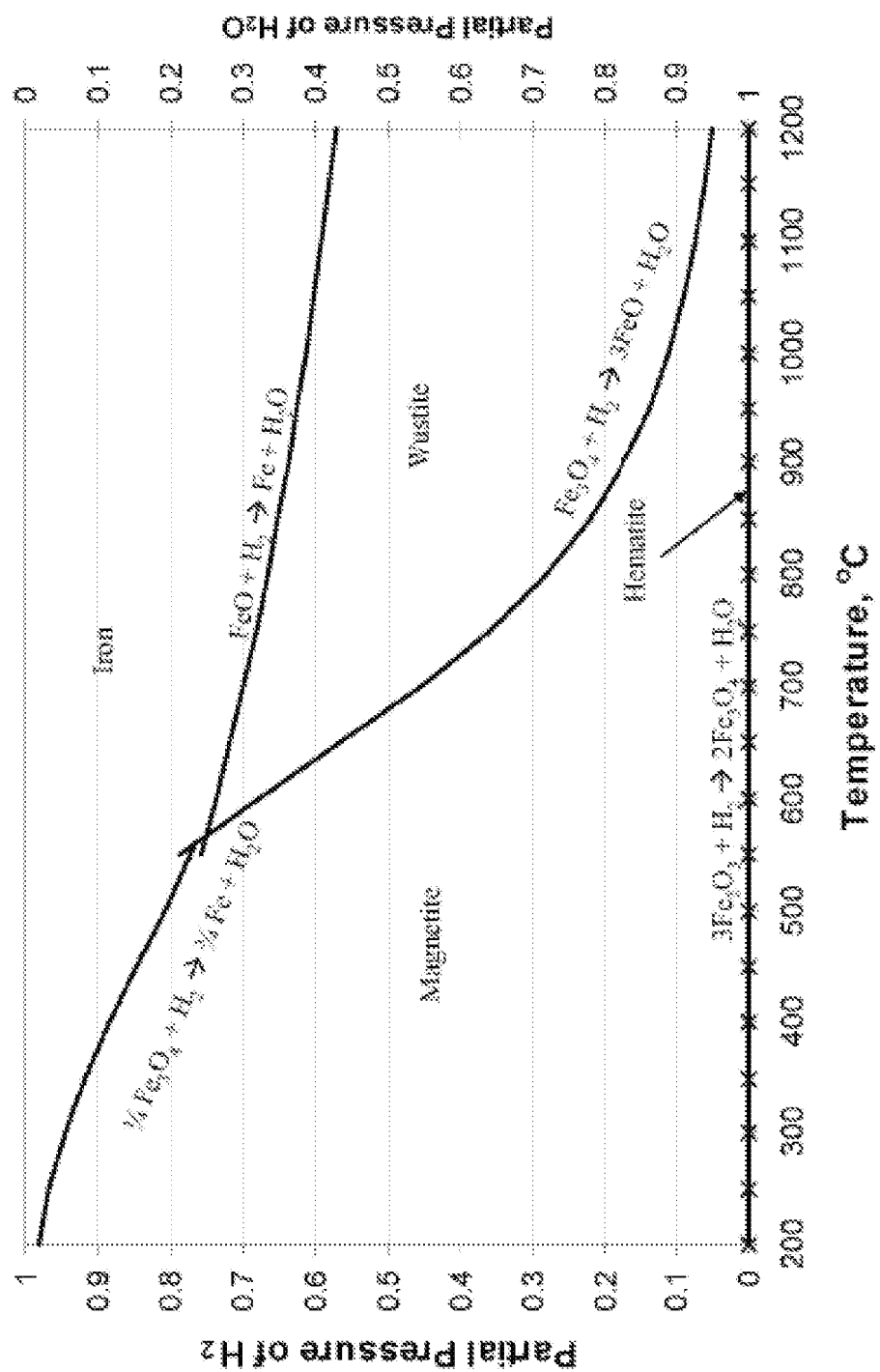
FIG. 12b is plot of $H_2/H_2O$ partial pressure equilibrium curves in the presence of iron in its various oxidation states.

Because of the additional step where $H_2$ is a desired product, a metal with more than two common oxidation states (e.g., Fe) must be used in this type of system. Using iron as a representative metal, $MO_s$ can be $Fe_2O_3$ (with Fe in the +3 oxidation state), $MO_q$ can be FeO or Fe (with Fe in the +2 or 0 oxidation state, respectively), and $MO_r$ can be $Fe_3O_4$ (with Fe in the +2/+3 oxidation state). FIGS. 12*a* and 12*b* depict partial pressure equilibria curves for the various oxidation states of iron in the presence of, respectively, $CO/CO_2$ and $H_2/H_2O$.

Figure 3:
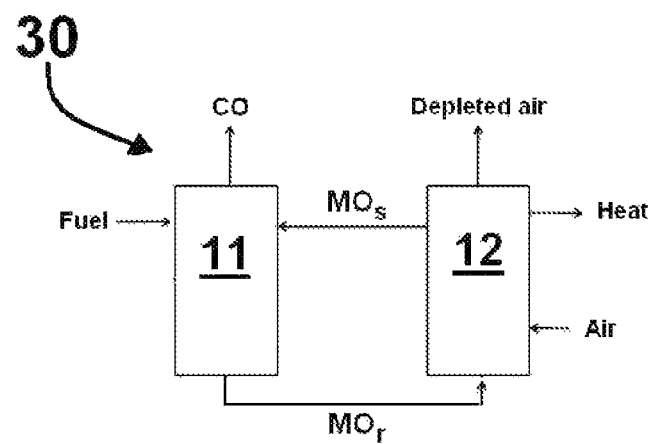
FIG. 3 is a schematic representation of an embodiment of a chemical looping partial oxidation system according to the present invention, desirably resulting in production of minor amounts of $CO_2$.

Chemical looping partial oxidation system 30 in FIG. 3 employs metal oxide particulates in fuel conversion reactor 11 to oxidize a carbonaceous fuel of the type described above, typically a carbonaceous solid, with the proviso that CO preferably is not used as a fuel because it is a desired product. Advantageously, the carbonaceous fuel can be one or more types of pulverized coal. The types of metal oxide particles, equipment and many of the conditions described above in connection with chemical looping combustion system 10 also are applicable here as well.

Fuel conversion reactor 11 can involve a single reactor bed or a combination or stack of reactor beds, for example, a design that includes multiple zones. The geometry and equipment is not particularly critical as long as the metal oxide particles and fuel are introduced in such a way so as to establish a generally co-current flow pattern or regime, which assists in preventing the metal oxide particles from combusting (i.e., fully oxidizing) the fuel. Fully oxidized metal oxide ($MO_s$) particles and fuel can be introduced together, or the fuel can be introduced not far downstream of the point where $MO_s$ particles are introduced (or vice versa), in which case the general flow of metal oxide particles typically is vertical, i.e., top-to-bottom. A co-current flow also can be approximated by a fluidized or bubbling bed in which the flow of both metal oxide particles and fuel, though turbulent (i.e., not linear) in each zone, can accompany one another in the same direction as they move in an essentially co-current manner from zone-to-zone.

As noted above, chemical looping partial oxidation system 30 is intended to produce as much CO, and as little $CO_2$, as possible. In other words, the predominant C-containing product of fuel converter reactor 11 in chemical looping partial oxidation system 30 is intended to be CO. By "predominant" is meant at least 50%, commonly at least 55%, more commonly at least 60%, typically at least 65%, and preferably ~70% of all gaseous combustion products that contain at least one C atom.

Referring again to FIG. 12*a*, where iron in its various oxidation states constitutes the M of the metal oxide particles, conducting the fuel conversion reaction at ~1100° C. (which correlates to $MO_s$ particles being introduced to fuel conversion reactor 11 at that temperature, or preferably even somewhat higher) results in a product mixture that is ~70% CO and ~30% $CO_2$. Many metals have equilibrium curves that do not permit this high of a ratio, although some metals, such as Co, might permit even higher ratios, e.g., up to ~85%, ~90%, or ~95% CO.

The oxidation process occurring in fuel converter reactor 11 of chemical looping partial oxidation system 30 involves the conversion of hydrocarbon(s) and $O_2$ into CO and $H_2O$. (The $H_2O$ byproduct is omitted from FIG. 3 to emphasize that CO is the primary, desirable product.) This reaction can be promoted by use of one or more enhancer gases, i.e., gases designed to accelerate reaction of the fuel with the $MO_s$ particles. Non-limiting potentially useful enhancer gases include $CO_2$, $H_2O$ (i.e., steam), CO and $H_2$. Enhancer gases are introduced at an early upstream portion of fuel conversion reactor 11, typically at or near the point where fuel is introduced or, when fuel conversion reactor 11 is operating in a fluidized bed condition, at a very downstream portion thereof.

Of particular interest as an enhancer gas, particularly in situations where the fuel is a solid such as pulverized coal, is $CO_2$ because of its ability to participate in the Boudouard reaction,

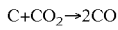

$$C + CO_2 \rightarrow 2CO$$

(The reversibility of this reaction is omitted because the direction shown here is predominant at the temperatures present in fuel conversion reactor 11.)

Some, up to essentially all, CO produced via the Boudouard reaction at upstream portions of fuel conversion reactor 11 is available to react with the $MO_s$ particles, producing more $CO_2$ and thereby establishing a chain reaction.

This conversion of solid C to gaseous CO at a very upstream portion of fuel conversion reactor 11 is advantageous because the efficiency of the overall reaction (i.e., hydrocarbon to CO) is significantly increased. Specifically, solid-solid reactions are notoriously slow, requiring actual contact of the two particles for an extended period of time, while the kinetics of gas-solid reactions are much better.

As $MO_s$ particles at upstream portions of fuel conversion reactor 11 are partially reduced by the conversion of CO to $CO_2$, the maximum possible ratio of [CO]:[$CO_2$] increases, i.e., referring again to FIG. 12a, a different equilibrium curve is established.

The CO produced by partial oxidation system 30 can be captured or, in certain embodiments, used onsite in one or more of the ways described below. Trace elements present in the fuel (e.g., Hg, As, Se, S and the like) might not react with the metal oxide particles and, if so, might need to be removed from the gaseous output where a particularly pure CO stream is desired. The ordinarily skilled artisan can envision numerous types of scrubbing, separating, sorbing and cleaning units and how such units can be incorporated (or adapted to be incorporated) into partial oxidation system 30.

Reduced $MO_r$ particles (with r and s having the same meanings as in connection with the earlier description of FIG. 1) are conveyed to particle regeneration unit 12 to be re-oxidized to $MO_s$ particles. In some embodiments, $MO_r$ particles can be regenerated in a fast fluidized bed (equivalent to regeneration unit 12) and returned to fuel conversion reactor 11 for another cycle. The energy created by the reaction(s) occurring regeneration unit 12 preferably is directed to fuel conversion reactor 11 to support the endothermic reactions predominating there.

Figure 4:
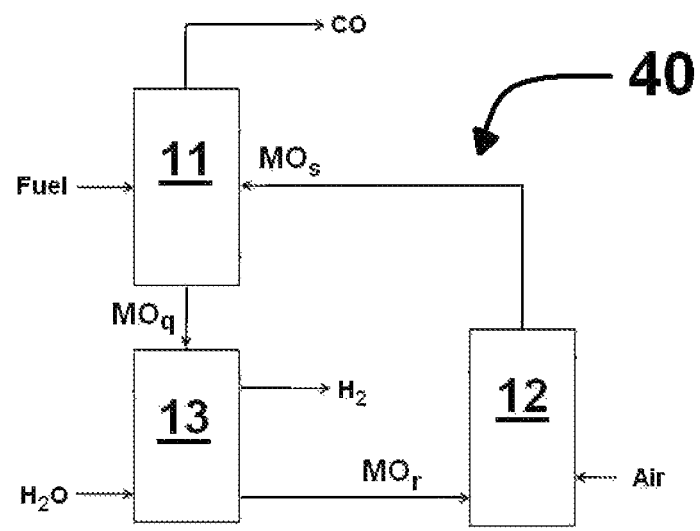
FIG. 4 is a schematic representation of an embodiment of a chemical looping partial oxidation system according to the present invention which employs a multi-step process to re-oxidize reduced metal oxide particles.

FIG. 4 schematically depicts a chemical looping partial oxidation system according to the present invention that includes the capacity to also produce $H_2$. Like the prior art system shown in FIG. 2, chemical looping partial oxidation system 40 employs metal oxide particulates in fuel conversion reactor 11 to oxidize a carbonaceous fuel (preferably a solid such as pulverized coal), $H_2$ generation unit 13, and particle regeneration unit 12. Like the prior art system in FIG. 2, chemical looping partial oxidation system 40 involves reduction of particulate $MO_s$ to the $MO_q$ state during combustion of fuel and partial oxidation from the $MO_q$ state to the $MO_r$ state in $H_2$ generation unit 13 during the reduction of $H_2O$ to $H_2$; $MO_s$ metal oxide particles are re-formed in particle regeneration unit 12 prior to being conveyed back to fuel conversion reactor 11.

$MO_q$ particles exiting fuel converter reactor 11 can be introduced, typically directly, into $H_2$ generation unit 13 while steam, introduced near the bottom of unit 13, oxidizes the moving $MO_q$ particles and forms $H_2$ which exits unit 13 nearer the top. Any steam present in the $H_2$ can be separated via, for example, condensation. Also, if desired, at least some of the $H_2$ can be recycled back for use in fuel conversion reactor 11 or directed elsewhere.

Although direct $MO_s$ formation is possible in generation unit 13, a more typical result is the intermediate (partially oxidized) $MO_r$ form. In this case, the $MO_r$ particles are transported to particle regeneration unit 12 where fully oxidized $MO_s$ particles can be formed by oxidation with any of a variety of oxidizing gases, typically air.

In chemical looping partial oxidation system 40, a hydrocarbon and $O_2$ are converted to CO and $H_2$, unlike system 20 from FIG. 2 which produces $CO_2$. Thus, this process results in two useful products, CO and $H_2$ which can be captured for later use or, more commonly, used immediately in one or more of the ways described below.

FIGS. 5-11 depict the aforedescribed chemical looping partial oxidation systems in a variety of settings. These are intended to convey the flexibility of the inventive systems for use in and with existing systems and equipment, as well as to provide a few exemplary embodiments to the ordinarily skilled artisan wishing to design integrated synthesis or production systems.

Figure 5:
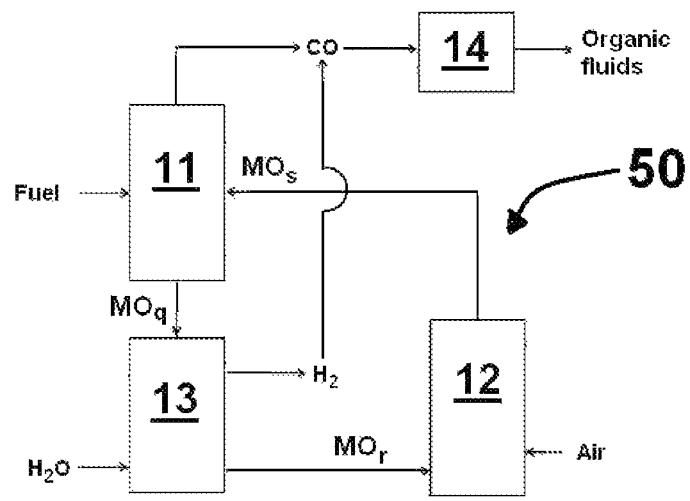
FIG. 5 is a schematic representation of a system for providing organic fluids via a F-T process integrated with an embodiment of a chemical looping partial oxidation system.

FIG. 5 schematically represents an integrated organic fluid generation system, where each of the primary components of the syngas used in the synthesis is provided from a chemical looping partial oxidation system such as the one described in connection with FIG. 4. The term "organic fluid" is intended to include gaseous and liquid hydrocarbons which can be used as substitutes for some of the typical refined products of petroleum, i.e., fuels and relatively short(er)-chain chemicals, and includes, but is not limited to, gasoline and diesel fuels. Tremendous cost and processing advantages are readily envisioned through an ability to generate and combine the components of syngas in a single system. For example, the hydrogen-to-carbon ratio of syngas produced by organic fluid generation system 50 can be adjusted in a way not possible in other chemical looping systems, i.e., by varying the amount of $H_2$ produced in unit 13, a feature that provides flexibility in the range of organic fluids that can be produced by F-T process reactor 14.

Organic fluid generation system 50 has a partial oxidation system similar to the one described in connection with FIG. 4 integrated with F-T process reactor 14. The F-T process and equipment used therein are familiar to the ordinarily skilled artisan, so a full description is not provided here; for additional information, the interested reader is directed to any of a variety of sources including U.S. Pat. No. 1,746,464 and patents citing the same as well as the web site of, and printed materials available from, the Fischer-Tropsch Archive hosted by the Emerging Fuels Technology (located at the time of filing at fischer-tropsch.org).

To prevent deactivation of the types of catalysts used in F-T process reactor 14, any acidic gases accompanying the CO combustion product from fuel conversion reactor 11 preferably are scrubbed or otherwise removed from that stream prior to it reaching reactor 14.

Figure 6A:
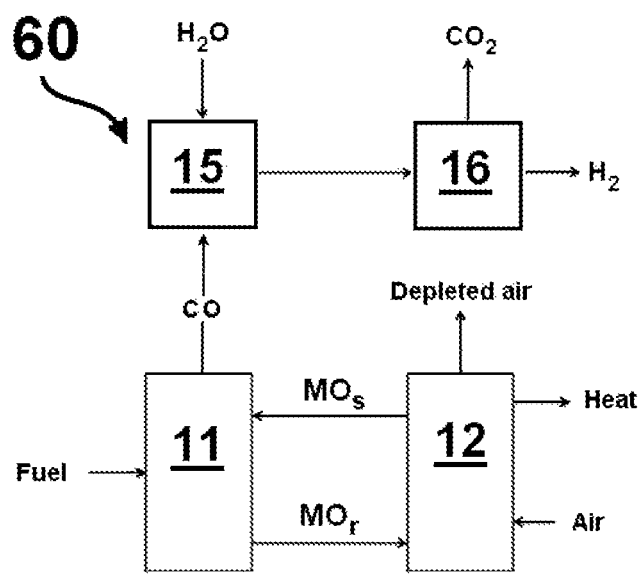
FIG. 6a is a schematic representation of a system for providing $H_2$ via a water gas shift (WGS) process integrated with an embodiment of a chemical looping partial oxidation system.
Figure 6B:
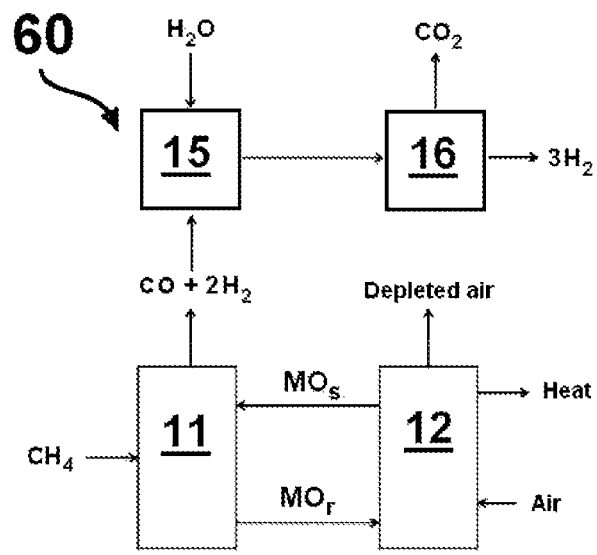
FIG. 6b is a schematic representation of a system for providing $H_2$ via a WGS process integrated with an embodiment of a chemical looping partial oxidation system in which natural gas (methane) is employed as a fuel.

FIGS. 6a and 6b (with the latter being a specific embodiment of the broader genus depicted in the former) schematically represent $H_2$ generating systems employing a WGS reaction in which CO is converted to $CO_2$, liberating more $H_2$ in the process. (A WGS reaction can provide relatively high purity $H_2$ from syngas, although it must be separated from other product and byproduct gases; see, e.g., U.S. Pat. Nos. 5,827,496, 6,007,699, 6,667,022, and 6,669,917 for chemical looping methods of separating syngas into separate streams of wet $H_2$ and $CO/CO_2$ using a mixture of limestone and iron oxide.)

In these Figures, $H_2$ generating system 60 involves a chemical looping partial oxidation system, such as partial oxidation system 30 set forth in FIG. 3, integrated with WGS reactor 15 and gas separating unit 16. CO produced in fuel conversion reactor 11 is conveyed to WGS reactor 15 where it is reacted with inputted steam to yield a combined stream of $CO_2$ and $H_2$, which gas separating unit 16 separates into its constituent components. The resulting $H_2$ product can be used as a fuel (directly or as a feedstock for fuel cells) or as a raw material in a variety of industrial processes such as, for example, the production of syngas.

The $H_2$ generating system 60 in FIG. 6b is specific to gaseous or vaporized hydrocarbons such as $CH_4$ (the use of which is depicted in FIG. 6b), $C_2H_6$, $C_2H_4$, $C_3H_8$, $C_3H_6$, $C_4H_{10}$, and the like. This embodiment of $H_2$ generating system 60 is, in substantial respect, an alternative to steam methane reformation (SMR) in which a feedstock (typically natural gas) is reacted with steam to form syngas, the efficiency of which is greatly reduced by the fact that $CO_2$ must be separated from $H_2$.

Figure 7:
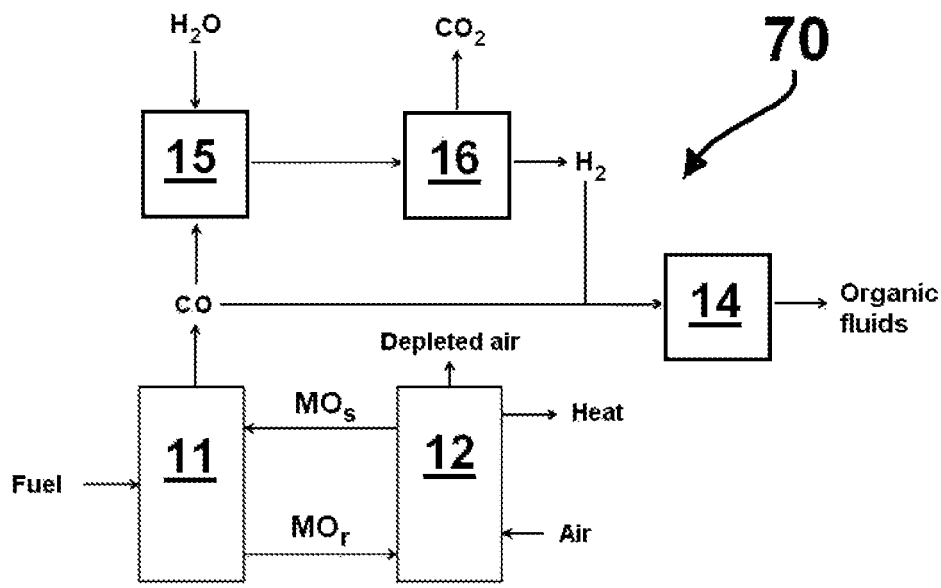
FIG. 7 is a schematic representation of a system for providing organic fluids via a F-T process integrated with a WGS process and an embodiment of a chemical looping partial oxidation system.

FIG. 7 schematically represents an integrated organic fluid generation system, with the primary components of the syngas used in the fluid synthesis being provided from a chemical looping partial oxidation system, such as the one described above in connection with FIG. 3, and a WGS process. Specifically, organic fluid generation system 70 involves a $H_2$ generating system, such as system 60 from FIG. 6a, integrated with F-T process reactor 14. The overall effect is a system that accomplishes effectively the same result as organic fluid generation system 50 from FIG. 5, albeit through the substitution of a combination of WGS reactor 15 and gas separating unit 16 instead of a $H_2$ generation unit. This might be desirable in a situation where, for example, existing WGS/separating equipment is in place and the facility is amenable to incorporation of a chemical looping combustion system.

Figure 8:
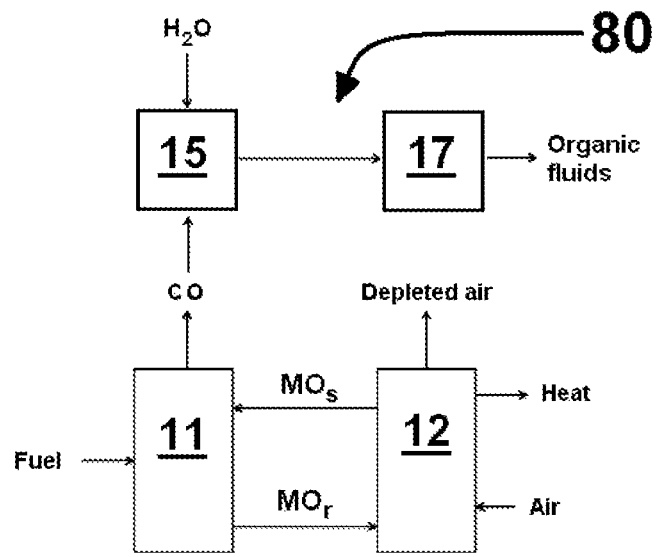
FIG. 8 is a schematic representation of a system for providing organic fluids via WGS and $CO_2$ hydrogenation processes integrated with an embodiment of a chemical looping partial oxidation system.

FIG. 8 schematically represents an alternative integrated organic fluid generation system, where the primary components of the syngas used in the fluid synthesis are provided from a chemical looping partial oxidation system and a combined WGS/$CO_2$ hydrogenation process. Specifically, organic fluid generation system 80 involves a chemical looping partial oxidation system designed to produce CO as a predominant C-containing combustion product (such as partial oxidation system 30 from FIG. 3), WGS reactor 15, and $CO_2$ hydrogenation reactor 17. The CO produced by fuel conversion reactor 11 is conveyed to WGS reactor 15 where it reacts with inputted steam to yield a combined stream of $CO_2$ and $H_2$, which $CO_2$ hydrogenation reactor 17 converts into one or more organic fluids. The overall effect is a system that accomplishes effectively the same result as organic fluid generation system 50 from FIG. 5, albeit employing a combination of WGS reactor 15 and $CO_2$ hydrogenation reactor 17 instead of an $H_2$ generation unit. This might be desirable in a situation where, for example, existing WGS/hydrogenation equipment is in place and the facility is amenable to incorporation of a chemical looping combustion system.

Figure 9:
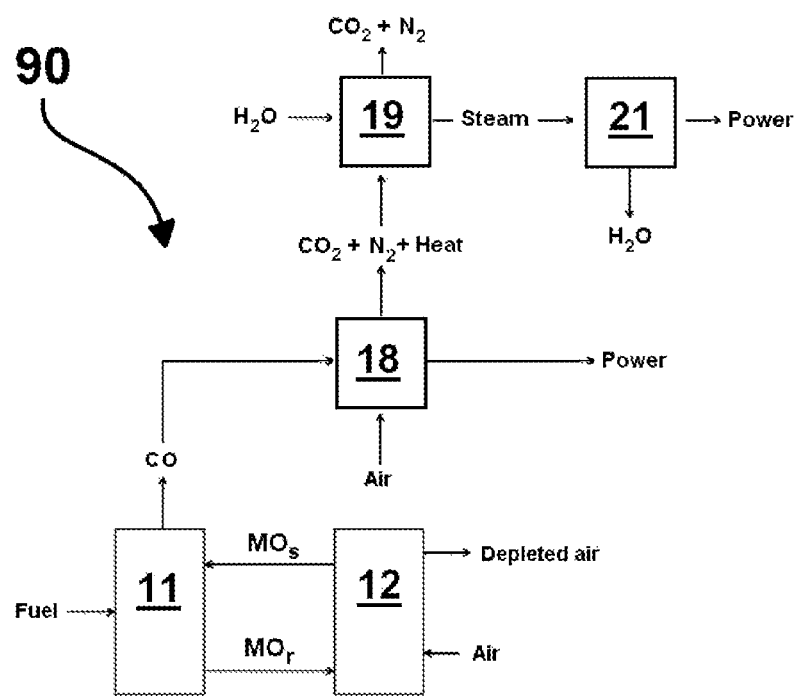
FIG. 9 is a schematic representation of a power generation system involving gas and steam turbines integrated with an embodiment of a chemical looping partial oxidation system.
Figure 10:
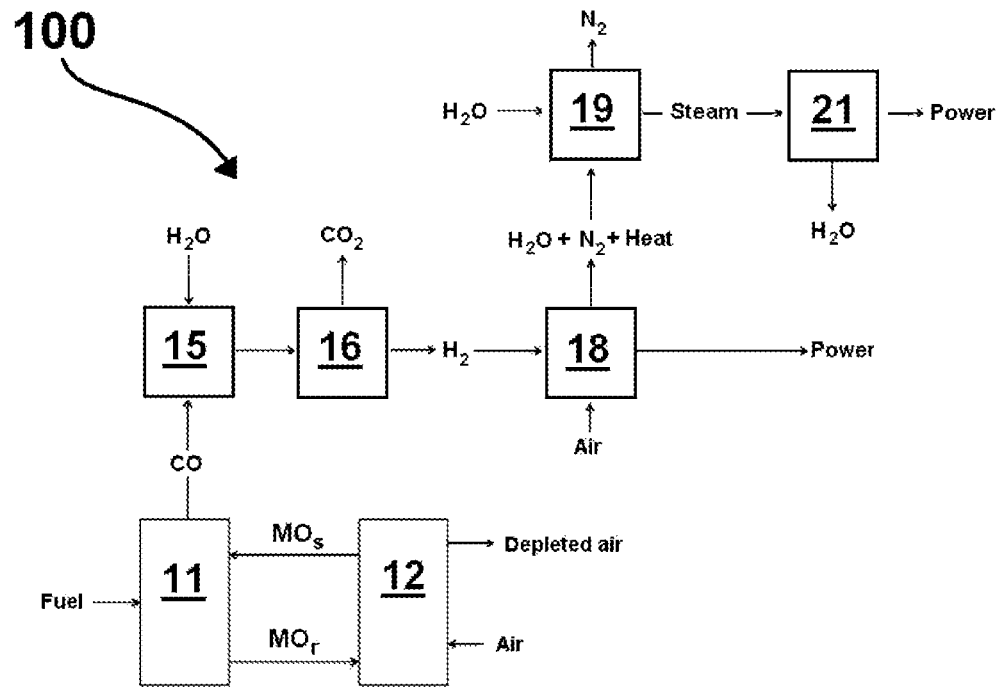
FIG. 10 is a schematic representation of power and $H_2$ generation systems integrated with an embodiment of a chemical looping partial oxidation system.

FIGS. 9 and 10 depict power generation based on, or modified to include, chemical looping partial oxidation systems.

FIG. 9 schematically represents a combined cycle power generation system that incorporates a chemical looping partial oxidation system. Power generation system 90 employs the CO produced by a chemical looping partial oxidation system, such as the one described above in connection with FIG. 3, to power gas turbine 18 and, ultimately, steam turbine 21. The outflow from gas turbine 18 passes into steam generation unit 19 where the heat boils inputted water, with the resulting steam powering steam turbine 21. In another embodiment, a boiler can be used in place of gas turbine 18 and steam generation unit 19. (A small disadvantage of power generation system 90 is that the $CO_2$ product does not lend itself to ready sequestration.)

FIG. 10 schematically represents an alternative power generation system that incorporates a chemical looping partial oxidation system. Power generation system 100 employs a $H_2$ generating system, such as system 60 described above in connection with FIG. 6a, with the $H_2$ stream exiting gas separating unit 16 being directed to and used to power gas turbine 18. From gas turbine 18 through steam turbine 21, this system is identical to the one described above in connection with FIG. 9. However, because of the inputs, the fuel conversion portion of system 100 does not generate any $CO_2$, while the $CO_2$ exiting gas separating unit 16 is capable of easy sequestration.

Figure 11:
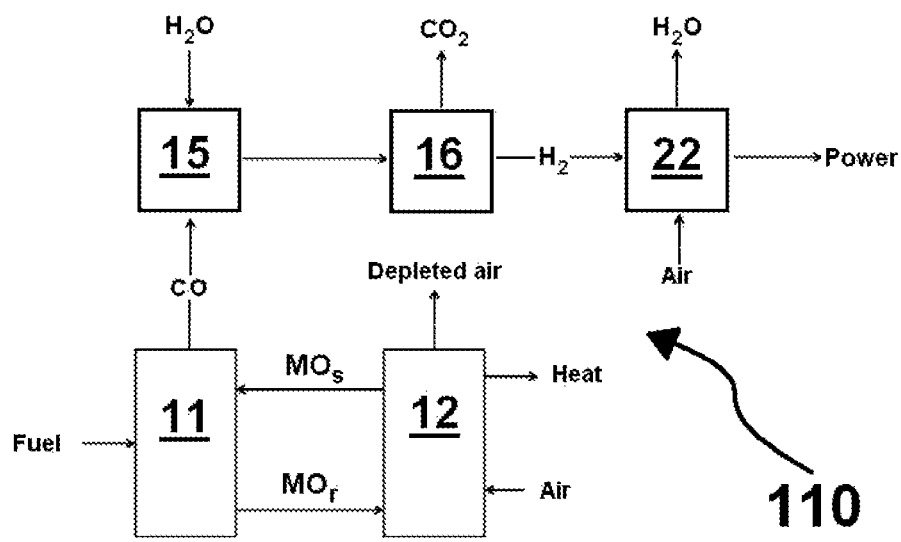
FIG. 11 is a schematic representation of a fuel cell integrated with an embodiment of a chemical looping partial oxidation system.

FIG. 11 schematically represents a fuel cell powering system. Power generation system 110 employs a $H_2$ generating system, such as system 60 described above in connection with FIG. 6a, with the $H_2$ stream exiting gas separating unit 16 being directed to and used to power fuel cell 22, e.g., a solid oxide fuel cell. Continued developments in fuel cell technology might result in a fuel cell powered by CO, which would permit WGS reactor 15 and gas separating unit 16 to be omitted from system 110.

The systems depicted in FIGS. 5-11 are intended to illustrate in a non-limiting way to the ordinarily skilled artisan the breadth and scope of potential applications of chemical looping partial oxidation systems that provide CO as a primary C-containing combustion product. Many of the sub-systems included in these Figures are or can be adapted to be at least somewhat modular and, accordingly, the ordinarily skilled artisan can adapt one or more portions of the foregoing schematic representations for use in another of the processes or systems. Accordingly, other combinations of sub-systems are envisioned.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

That which is claimed is:

1. A method for providing, in a chemical looping system which employs particles that comprise an oxide of a metal having multiple oxidation states, said system comprising an oxidation bed reactor and a fuel conversion reactor, from a carbonaceous fuel a gaseous output that comprises CO as a primary carbon-containing product, said method comprising contacting said carbonaceous fuel with particles provided directly from said oxidation bed reactor to said fuel conversion reactor, said contacting occurring in said fuel conversion reactor with a generally co-current flow pattern, whereby oxidized metal in said particles is reduced to a lower oxidation state, thereby providing said gaseous output, transporting the reduced particles from said fuel conversion reactor to said oxidation bed reactor, and contacting said particles with an oxygen-containing gas stream so as to oxidize said metal.

2. The method of claim 1 wherein said particles exiting said fuel conversion reactor are transported to separate bed reactor prior to returning to said oxidation bed reactor, wherein steam is introduced into said bed reactor so as to provide $H_2$ particles that comprise a metal oxide with said metal in an oxidation state intermediate that of said metal upon entry of said particles to and exit of said particles from said fuel conversion reactor.

3. The method of claim 2 wherein said $H_2$ is combined with CO in said gaseous output from said fuel conversion reactor so as to provide syngas.

4. The method of claim 1 further comprising subjecting a portion of said CO to a water gas shift reaction to provide $CO_2$ and $H_2$ and combining the resulting $H_2$ with another portion of said CO so as to provide syngas.

5. The method of claim 4 further comprising directing syngas to a gas separating unit for separating the syngas into its constituent components.

6. The method of claim 4 further comprising subjecting said CO and said $H_2$ to a Fischer-Tropsch process reactor to produce organic fluids.

7. The method of claim 1 further comprising introducing $CO_2$ into said fuel conversion reactor so as to promote production of CO via a Boudouard reaction.

8. The method of claim 1 further comprising subjecting said CO to a water gas shift reaction and recovering the resulting hydrogen.

9. The method of claim 1 further comprising subjecting a portion of said CO to a water gas shift reaction and subjecting the resulting carbon dioxide to a hydrogenation reaction.

10. The method of claim 1 further comprising directing said gaseous output to a gas turbine.

11. The method of claim 1 wherein said carbonaceous fuel comprises a particulate solid.

12. The method of claim 11 wherein said particulate solid comprises pulverized coal.

13. The method of claim 1 wherein said metal oxide particles are iron oxides in a porous composite.

14. The method of claim 1 wherein the $CO:CO_2$ ratio of said gaseous output is at least 60:40.

15. The method of claim 14 wherein the $CO:CO_2$ ratio of said gaseous output is at least 65:35.

16. The method of claim 1 wherein said contacting step occurs in a moving packed bed of said particles.

17. The method of claim 1 wherein said contacting step occurs in a fluidized bed reactor comprising multiple zones, said metal oxide particles and said carbonaceous fuel flowing in the same direction while moving through said zones.

18. The method of claim 16 wherein movement of particles in said moving packed bed is from top to bottom of said reactor.

19. The method of claim 1 wherein said carbonaceous fuel is other than CO.

20. The method of claim 19 wherein said carbonaceous fuel is pulverized coal.

21. The method of claim 1 wherein said metal having multiple oxidation states has at least q, r and s oxidation states where q<r<s, said contacting step involving metal in said s oxidation state.

* * * * *